(12) United States Patent
Jones et al.

(10) Patent No.: US 9,325,506 B2
(45) Date of Patent: Apr. 26, 2016

(54) CRYPTOGRAPHICALLY ENFORCING STRICT SEPARATION OF ENVIRONMENTS

(71) Applicant: Red Hat, Inc., Raleigh, NC (US)

(72) Inventors: Peter Jones, Cambridge, MA (US); David Cantrell, Medford, MA (US)

(73) Assignee: Red Hat, Inc., Raleigh, NC (US)

(*) Notice: Subject to any disclaimer, the term of this patent is extended or adjusted under 35 U.S.C. 154(b) by 24 days.

(21) Appl. No.: 14/494,380

(22) Filed: Sep. 23, 2014

(65) Prior Publication Data

US 2016/0087801 A1    Mar. 24, 2016

(51) Int. Cl.
H04L 9/32    (2006.01)
H04L 9/14    (2006.01)
G06F 9/44    (2006.01)

(52) U.S. Cl.
CPC ............ *H04L 9/3247* (2013.01); *G06F 9/4406* (2013.01); *H04L 9/14* (2013.01)

(58) Field of Classification Search
CPC .................................................. H04L 9/3247
USPC ......................................................... 713/176
See application file for complete search history.

(56) References Cited

U.S. PATENT DOCUMENTS

| 7,496,757 B2 | 2/2009 | Abbott et al. |
| 7,953,982 B2 | 5/2011 | Walmsley |
| 8,060,747 B1 | 11/2011 | Leonard et al. |
| 8,775,572 B2 | 7/2014 | Gbadegesin et al. |
| 2012/0054734 A1 | 3/2012 | Andrews et al. |
| 2013/0031369 A1* | 1/2013 | Balinsky ............ G06F 21/6209 713/176 |
| 2013/0318357 A1 | 11/2013 | Abraham et al. |

FOREIGN PATENT DOCUMENTS

EP    1850256    6/2010

OTHER PUBLICATIONS

Benjamin Mako Hill, et al., "Ubuntu Package Management," http://www.informit.com/articles/article.aspx?p=2118682&seqNum=3, Sep. 4, 2013, pp. 13.
SOPRA Group/ISID, "NICS—Information Assurance Application Development Standards," NDIRECT Government Services, https://www.google.com/url?sa=t&rct=j&q=&esrc=s&source=web&cd=1&cad=rja&uact=8&ved=0CB8QFjAA&url=http%3A%2F%2Fuxm.nidirect.gov.uk%2Fdocs%2Fiaf-application-development-standards-v1.2-sept-2011.doc&ei=SBL7U-K5JZCLuASm94CgBw&usg=AFQjCNG1pc0-Gw9-5lh9toi03nKDLoi4Tg&bvm=bv.73612305,d.c2E, Sep. 2011, pp. 36.
Ian Shields, "Learn Linux, 101: RPM and YUM Package Management," http://www.ibm.com/developerworks/library/l-lpic1-v3-102-5/, May 11, 2010, pp. 16.

* cited by examiner

*Primary Examiner* — Peter Shaw
(74) *Attorney, Agent, or Firm* — Haynes and Boone, LLP

(57) ABSTRACT

A system and method are disclosed for enforcing site or organization localized provisioning policy using cryptography. In an exemplary method, a signing key is used to generate a signature for an application. The signature of the application is verified using a verifying key in order to determine whether the application adheres to the site or organization localized provisioning policy. The verifying may be performed during initialization of a computing device or during runtime of an operating system at the computing device.

20 Claims, 5 Drawing Sheets

CRYPTOGRAPHICALLY ENFORCING STRICT SEPARATION OF ENVIRONMENTS

BACKGROUND

The present disclosure relates generally to cryptography, and more particularly to methods and systems for using cryptography to enforce strict separation of computing environments.

There are many scenarios where it is beneficial to provide separate computing environments.

In one scenario, software such as an operating system kernel may be developed in a development computing environment, and promoted through a quality assurance computing environment, a testing computing environment, and a validation computing environment prior to deployment at a production computing environment. At a production computing environment there may be a systems administrator who installs software according to site or organization localized provisioning policy. Software that is deployed at the production computing environment may generally be release stage software, where software deployed at in the development, quality assurance, testing and validation computing environments may include development applications, testing applications and pre-release stage software.

In another scenario, there may be a plurality of business unit computing environments. In each business unit computing environment there may be a provisioning policy that certain software is to be installed and other software is not to be installed (e.g., an accounting business unit may have access to accounting software but not to human resources software that is used by the human resources business unit). Similarly, there may be different security domain computing environments, each with a provisioning policy to configure systems in the particular security domain computing environment with a particular set of software applications that meet a certain risk-profile.

In some cases, a systems administrator at one computing environment may deploy software into a computing environment that is in violation of the provisioning policy for that computing environment. For example, a systems administrator may deploy an operating system kernel from a development computing environment onto a computing device that is a member of a production computing environment. This deployment may be a violation of the localized provisioning policy.

Currently, the deployment of software is constrained by the diligence of a systems administrator to apply provisioning policy correctly. In many cases, it is trivial for a systems administrator to deploy software that violates localized provisioning policy as there is no strong enforcement mechanism. It is desirable to enforce the localized provisioning policy.

SUMMARY

According to one example, a method includes assigning a verifying key to a computing device that belongs to a particular computing environment, wherein the verifying key is a member of a cryptographic key pair that comprises the verifying key and a signing key; using the verifying key by one or more of: a firmware application, a boot loader, an operating system kernel, or a package manager to verify an application, wherein the verifying is performed by determining whether the application has a signature that was generated with the signing key.

According to one example, a system includes a processor and a memory comprising machine readable instructions that when executed by the processor, cause the system to: assign a verifying key to a computing device that belongs to a particular computing environment, wherein the verifying key is a member of a cryptographic key pair that comprises the verifying key and a signing key; use the verifying key by one or more of: a firmware application, a boot loader, an operating system kernel, or a package manager to verify an application, wherein the verifying is performed by determining whether the application has a signature that was generated with the signing key.

According to one example, a non-transitory computer readable medium includes computer readable code for execution on a processing system, the computer readable program code comprising computer readable program code to: assign a verifying key to a computing device that belongs to a particular computing environment, wherein the verifying key is a member of a cryptographic key pair that comprises the verifying key and a signing key; use the verifying key by one or more of: a firmware application, a boot loader, an operating system kernel, or a package manager to verify an application, wherein the verifying is performed by determining whether the application has a signature that was generated with the signing key.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
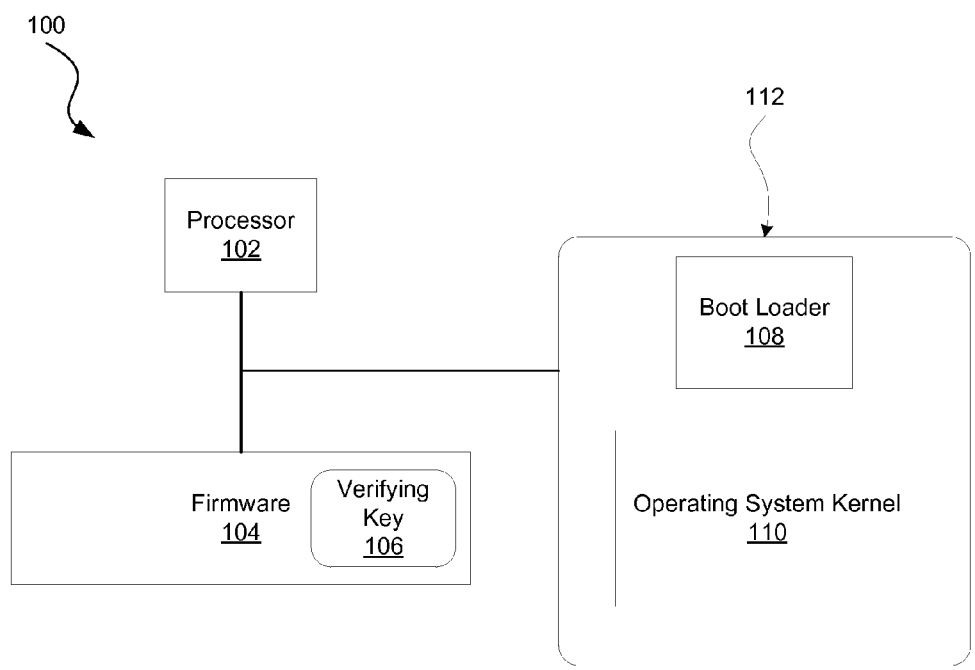
FIG. 1 is a diagram showing an illustrative system for enforcing separation of environments using cryptography, according to one example of principles described herein.

FIG. 1 is a diagram showing an illustrative system for enforcing separation of environments using cryptography. According to the present example, computing system 100 includes processor 102, firmware 104, verifying key 106, boot loader 108, operating system kernel 110, and memory 112. Processor 102 is structured to execute instructions from firmware 104 and memory 112.

In some examples, firmware 104 is software that is embodied in a memory such as a non-volatile memory. Examples of non-volatile memories include Flash EEPROM, battery backed SRAM, or ferro-electric memories typically referred to as FRAM or MRAM, and other memories now available or later developed.

In some examples, computer-executable code, such as a plurality of instructions stored on memory 112 or firmware 104, and/or any combination thereof, may be executed by processor 102 to cause processor 102 to carry out or implement one or more of the methods. In some examples, processor 102 executes the plurality of instructions in connection with a virtual computing system.

In some examples, combinations of software and hardware are used for providing enhanced functionality and performance for certain embodiments of the present disclosure. In some examples, software functions are directly manufactured into a silicon chip. Accordingly, it should be understood that combinations of hardware and software are also included within the definition of a computer system and are thus envisioned by the present disclosure as possible equivalent structures and equivalent methods.

According to the present example, firmware 104 is structured with access to a verifying key 106 that is stored at a memory location accessible to firmware 104. In another example, verifying key 106 may comprise a key database that includes a plurality of verifying keys. Firmware 104 is any standard or proprietary program that is capable of verifying a signature, such as any Unified Extensible Firmware Interface (UEFI) compliant firmware that supports a secure boot feature.

According to the present example, verifying key 106 is a member of a cryptographic key pair that includes verifying key 106 and a corresponding signing key, together referred to as a key pair. The key pair may be keys generated by a third-party, such as a certificate issuer, or by a user of the system using any standard or proprietary program, such as OPENSSL, in accordance with any cryptography standard, such as X.509. The key pair may be any standard or proprietary type of key pair, such as an RSA public key and private key.

In the present example, boot loader 108 may be any standard or proprietary program, such as GRUB (Grand Unified Bootloader), which may select an operating system kernel or specific kernel configuration to load during an initialization process at computing system 100. In this example, boot loader 108 is structured with a verifying key and a signature.

In another example, boot loader 108 is structured as a first-stage boot loader and a second-stage boot loader. The first-stage boot loader is structured with a verifying key and a signature. The first-stage boot loader may be any standard or proprietary program, such as SHIM, which loads a second-stage boot loader. The second-stage boot loader is software, such as GRUB, which may select an operating system kernel or specific kernel configuration to load during an initialization process at a computing device. The second stage boot loader is structured with a verifying key and a signature.

Although only one operating system kernel is shown in FIG. 1, memory 112 may store a plurality of operating system kernels.

Operating system kernel 110 may be any standard or proprietary operating system kernel software, including WINDOWS, LINUX, UNIX and OS X based operating system kernels, for example.

In the present example, each operating system kernel is structured with a verifying key and a signature.

In the present example, boot loader 108 and operating system kernel 110 are stored in memory 112. In another example, memory 112 comprises a plurality of memory devices and boot loader 108 and operating system kernel 110 are stored in separate memory devices. Further, in the plurality of memory devices example, a first memory device stores a first operating system kernel, and a second memory device stores a second operating system kernel. In another example, a boot loader or operating system kernel each are divided into a plurality of sub-parts such that each sub-part is stored on a different memory device.

In one example, processor 102, firmware 104, boot loader 108 and operating system kernel 110 are integrated within a stand-alone device. In another example, processor 102, firmware 104, boot loader 108 and operating system kernel 110 are implemented in two or more devices that are coupled together. For example, memory 112 may be a remote memory that is accessible via a network.

In some examples, the network may include a modem, network card, or any other device to enable computing system 100 to communicate with other computing devices. In some examples, a computing device represents a plurality of interconnected (whether by intranet or Internet) computer systems, including without limitation, personal computers, mainframes, personal digital assistants (PDAs), digital hubs, smart televisions, set-top boxes, streaming boxes, smartphones and cell phones.

The verifying keys and signatures structured into the elements of computing system 100 provide a strong enforcement mechanism of site or organization localized provisioning policy, as will be described in more detail with respect to the following figures.

Figure 2A:
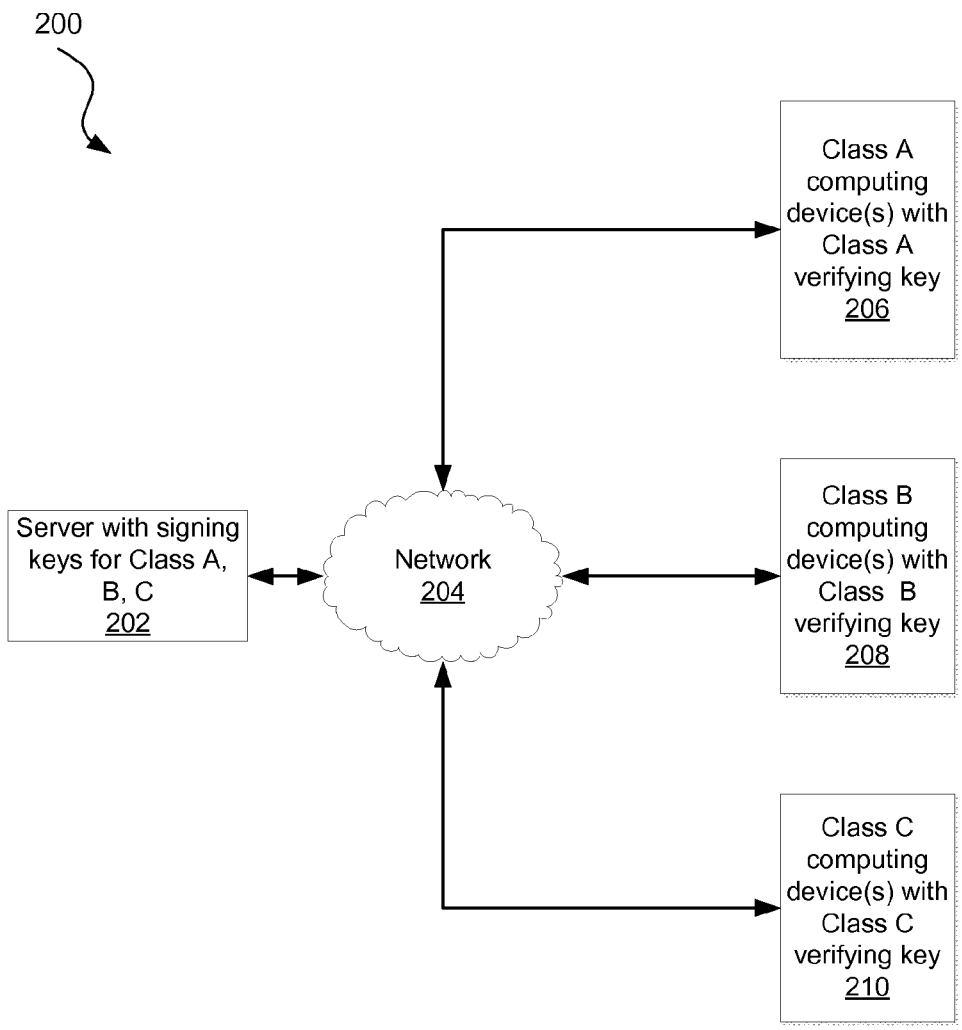
FIG. 2A is a diagram showing an illustrative computer network for transmitting data between a server and computing devices belonging to a plurality of computing environments, according to one example of principles described herein.

FIG. 2A is a diagram showing an illustrative computer network for communicating data between a server and computing devices that are members of computing environments.

In the present example, a computer network 200 comprises a server 202 and computing devices 206, 208 and 210. Server 202 is capable of provisioning and deploying software to other systems, and may be referred to as a provisioning server. Server 202 is structured with access to signing keys for one or more computing environments. Signing keys "sign" applications that are deployed to computing devices in each computing environment. In this example, "signing" an application means encrypting an application's content, a hash of the application's content or some other data relating to the application using a signing key. The encrypted data is referred to as a signature for the application. Such signatures may also be referred to as digital signatures. A signature for an application may be embedded into the application itself or included with the application in a separate file.

In the present example, the application includes a checksum or other code that can be used verify that the contents of the application have not been modified. The application may be encrypted and/or compressed.

Computing environments may be, for example, a Class A computing environment, Class B computing environment and Class C computing environment that may correspond to a development environment, a quality assurance environment and a production environment, respectively. There may be computing environments in addition to those shown, such as a testing environment. Each computing environment may include one or more computing devices. In another example, each computing environment is a particular security domain or business unit.

In the present example, each computing environment is assigned a cryptographic key pair that comprises a signing key and a verifying key. In this example, each cryptographic key pair is unique to a particular computing environment.

In some examples, the signing key may be referred to as a "private key" and the verifying key may be referred to as a "public key." As is explained above, the signing key is used to generate a signature for an application. The signature may be decrypted using the verifying key that is a member of the same key pair as the signing key used to generate the signature. The decrypted signature data may then be compared to application data to determine whether there is a match. For example, if the signature is an encrypted hash of the application's contents, decrypted signature data may be compared to a calculated hash of the application's contents to determine whether there is a match. If there is a match, then the signature is considered to be "verified." The decryption of the signature using the verifying key and successful matching of the signature's decrypted contents is referred to as "verifying the signature."

In the present example, computing device 206 is a member of the Class A computing environment and is structured with access to the verifying keys for the Class A computing environment. Computing device 208 is a member of the Class B computing environment and is structured with access to the verifying keys for the Class B computing environment. Computing device 210 is a member of the Class C computing environment and is structured with access to the verifying keys for the Class C computing environment.

The computing devices in this example are coupled via network 204, which communicates data between server 202 and computing devices 206, 208, and 210. In another example, the computing devices communicate data via a medium other than a network medium, such as by using a FLASH drive or another type of computer readable storage device to transfer data.

In another example, a computing device may be a member of a plurality of computing environments, such that the computing device is assigned the verifying key for each of the computing environments for which the computing device is a member.

Figure 2B:
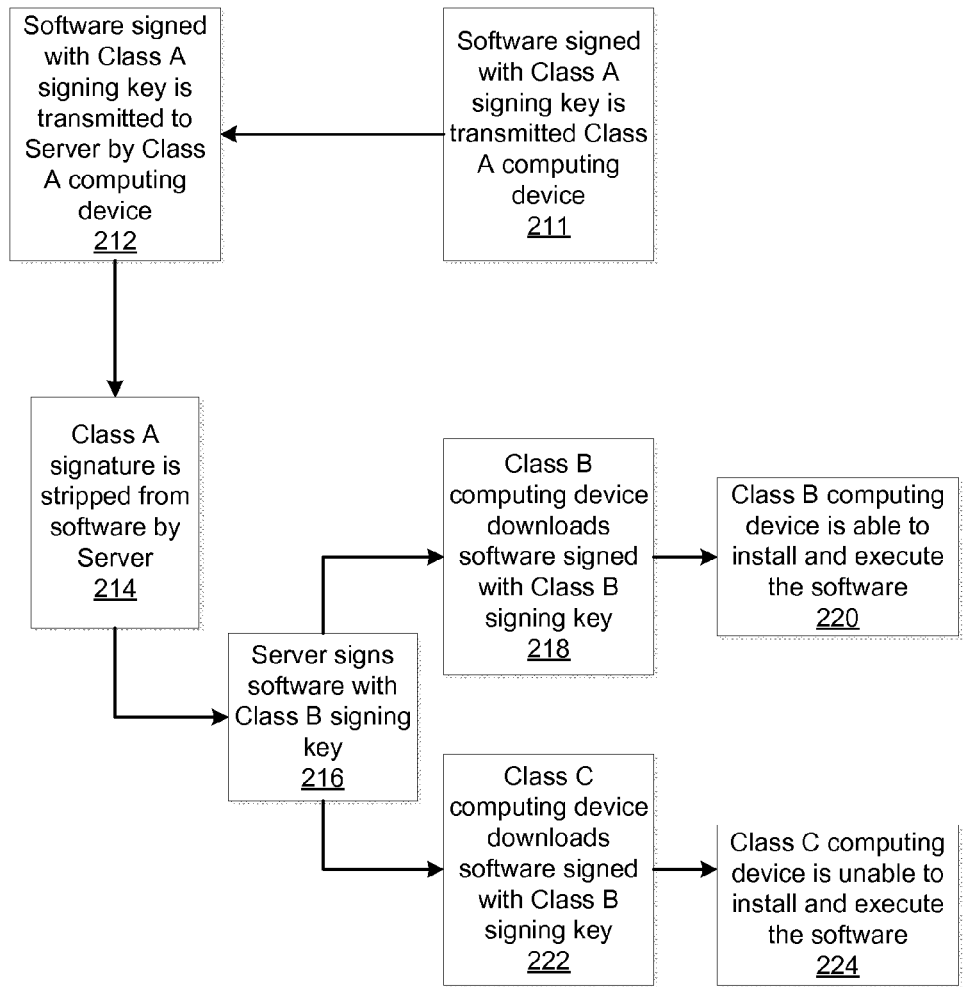
FIG. 2B is a flowchart showing an illustrative distribution of cryptographically signed software to computing devices that are members of a plurality of computing environments and enforcement of localized provisioning policy at the computing devices, according to one example of principles described herein.

FIG. 2B is a flowchart showing an illustrative network distribution of a cryptographically signed application to computing devices belonging to a plurality of computing environments.

In the present example, at step 211 server 202 signs a software application for Class A computing device 206 using the Class A signing key, and transmits the application to Class A computing device 206.

In the present example, the application may be structured with a verifying key. For example, the application may be a first-stage boot loader that is structured with a verifying key for a second-stage boot loader. In another example, the application may be a second-stage boot loader that is structured with a verifying key for an operating system. In another example, the application may be an operating system that is structured with a verifying key for one or more run-time applications. Server 202 may structure the applications with the verifying keys prior to transmitting the applications, or users may enroll keys after receiving the applications from server 202.

In the present example, server 202 deploys the application for development and testing at Class A computing device 206. Class A computing device 206 verifies the application with the Class A verifying keys. After testing the application at Class A computing device 206, a determination is made that the application is ready for deployment in a Class B computing environment.

In the present example, at step 212 Class A computing device 206 transmits the application to server 202. In this example, the application still has the Class A signature.

At step 214, server 202 strips the Class A signature from the application. The application is at that time placed into an unsigned state. In one example, the stripping of the signature requires server 202 to decrypt the application and/or Class A signature using the Class A verifying key.

At step 216, the server 202 inputs a Class B signing key and the application into a cryptographic signing function to determine a Class B signature for the application. The Class B signature is embedded with the application.

In the present example, at step 218, Class B computing device 208 downloads the application and signature that was generated using the Class B signing key.

At step 220, Class B computing device 208 inputs its Class B verifying key, the application and the signature into a verifying function. The Class B verifying key is accessible to Class B computing device 208. For example, if the application is a run-time application, the Class B verifying key may have been deployed with the operating system that the Class B computing device is executing. In another example, if the application is an operating system, the Class B verifying key may have been deployed with the boot loader that the Class B computing device is executing. In another example, if the application is a boot loader, the Class B verifying key may have been deployed with the firmware that the Class B computing device is executing.

Class B computing device 208 is able to verify the signature because the Class B verifying key is a member of same key pair as the Class B signing key that signed the application.

At step 222, Class C computing device 210 downloads the application and signature that was generated using the Class B signing key.

At step 224, Class C computing device 210 inputs its Class C verifying key, the application and the Class B signature into a signature verifying function. Class C computing device 210 is not able to verify the signature because the Class C verifying key is not a member of same cryptographic key pair as the Class B signing key that was used to sign the application. Class C computing device 210 does not have access to the Class B verifying key in order to verify the signature.

Accordingly, a provisioning policy is enforced that mandates that Class A computing devices 206 only execute applications that are intended to be used in a Class A computing environment, Class B computing devices 208 only execute applications that are intended to be used in a Class B computing environment, and Class C computing devices 210 only execute applications that are intended to be used in a Class C computing environment.

Figure 3:
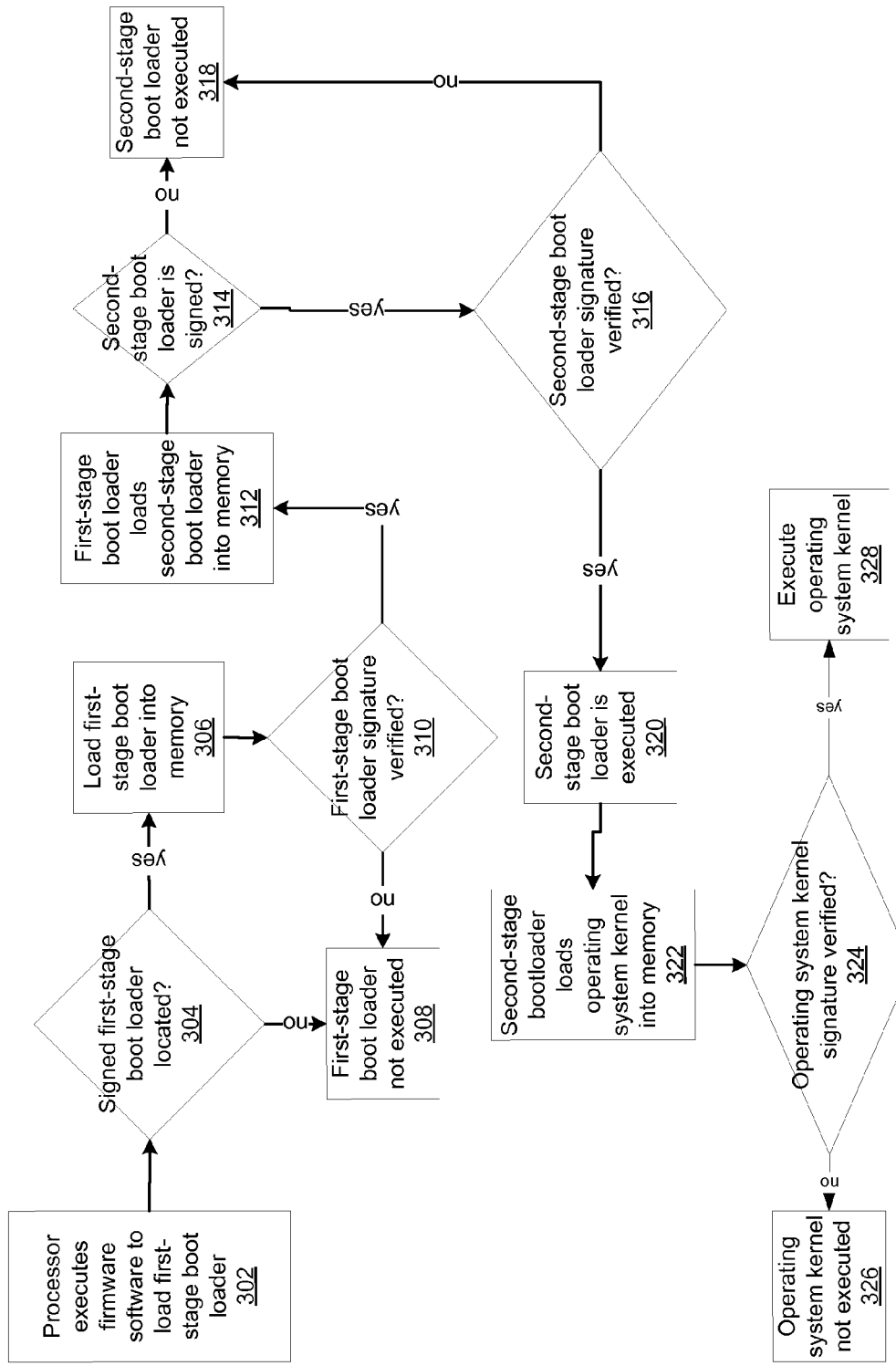
FIG. 3 is a flowchart showing an illustrative method for enforcing local provisioning policy at a computing device during initialization of the computing device, according to one example of principles described herein.

FIG. 3 is a flowchart showing an illustrative method for enforcing local provisioning policy at a computing device during initialization of the computing device, such as during a booting process.

In the present example, the computing device is a member of a particular computing environment and has access to one or more stored verifying keys corresponding that that computing environment.

At step 302, the computing device is initialized during what is typically referred to as "booting up" the computing device. In this example, the processor at the computing device executes firmware code attached to a particular memory address. At step 304, the code at the particular memory address either searches for a boot loader or reads a variable that identifies the location of the boot loader. If the boot loader is not located, the boot loader would not be executed and typically an error would result at step 308.

For most users it is not convenient, or the user may not have access, to update a verifying key stored on the firmware. In this example, first-stage boot loader serves as a helper application to enroll a verifying key for second-stage boot loader. In this example, by using a first-stage boot loader, updates to i) a boot loader, such as GRUB, that selects an operating kernel to boot and ii) the operating system kernel, typically would not require updating a verifying key stored in the firmware. The use of first-stage boot loader and second-stage boot loader, in this example, results in the advantage of a more secure and convenient key management mechanism.

In this example, a first-stage boot loader is located. The first-stage boot loader is loaded into memory at step 306.

At step 310, a processor executes firmware code to determine whether the located first-stage boot loader is signed. If the first-stage boot loader is signed, the processor executes firmware code to verify the first-stage boot loader with a verifying key that is accessible to the firmware. If the first-stage boot loader is not signed or if the signature is not verified, the first-stage boot loader is not executed and typically an error results at step 308.

If the first-stage boot loader signature is verified, then the first-stage boot loader is executed at step 312 to load a second-stage boot loader into memory. The first-stage boot loader determines whether the second-stage boot loader is signed at step 314. If the second-stage boot loader is signed, then the first-stage boot loader attempts to verify the signature using a verifying key that is accessible to the first-stage boot loader at step 316. If the second-stage boot loader is not signed or if the signature is not verified, the second-stage boot loader is not executed and typically an error would result at step 318.

In another example, there is no first-stage boot loader and the firmware instead loads the second-stage boot loader and verifies the signature of the second-stage boot loader using the verifying key that is accessible (i.e., rather than loading and verifying a first-stage boot loader). The method would proceed, after that point, similar to the method using first-stage and second-stage boot loaders as illustrated in FIG. 3 and described below.

In the present example, at step 320, the signature second-stage boot loader is verified and the second-stage boot loader is executed.

At step 322, the processor executes the second-stage boot loader to load an operating system kernel into memory. In the present example, the second-stage boot loader provides a list of operating system kernels to load from which the user makes a selection. In another example, the second-stage boot loader automatically loads a particular operating system kernel without providing the user with an opportunity to make a selection.

At step 324, the second-stage boot loader determines whether the operating system kernel is signed. If the operating system kernel is signed, the second-stage boot loader uses a verifying key accessible to the second-stage boot loader to verify the operating system kernel signature. If the operating system kernel is not signed or if the signature is not verified, the operating system kernel is not executed and typically an error would result at step 326. At step 326, in some examples, a user is provided with another opportunity to select an operating system kernel to load.

At step 328, the operating system kernel signature is verified and the operating system kernel is executed.

Once the operating system kernel is running, additional functionality may be provided that is not shown, such as executing a package manager. A package manager may have access to one or more verifying keys that are used to verify signatures of applications that the computing device is attempting to install and execute. In this example, the provisioning policy is enforced both during initialization, as described above, as well as during runtime by the package manager.

In this example, applications are packaged for distribution into container formats. A package manager may be one or more software tools that verify file checksums to ensure complete and correct packages, verify digital signatures of packages, decompress and extract applications from packages, install, upgrade, configure and remove applications. Packages may be structured as any standard or proprietary container format, such as .rpm, .deb, .slp, .pkg, .tgz, and so forth. Examples of package managers include RPM package manager, dpkg, OpenPKG, Steam, Windows installer, and so forth.

Figure 4:
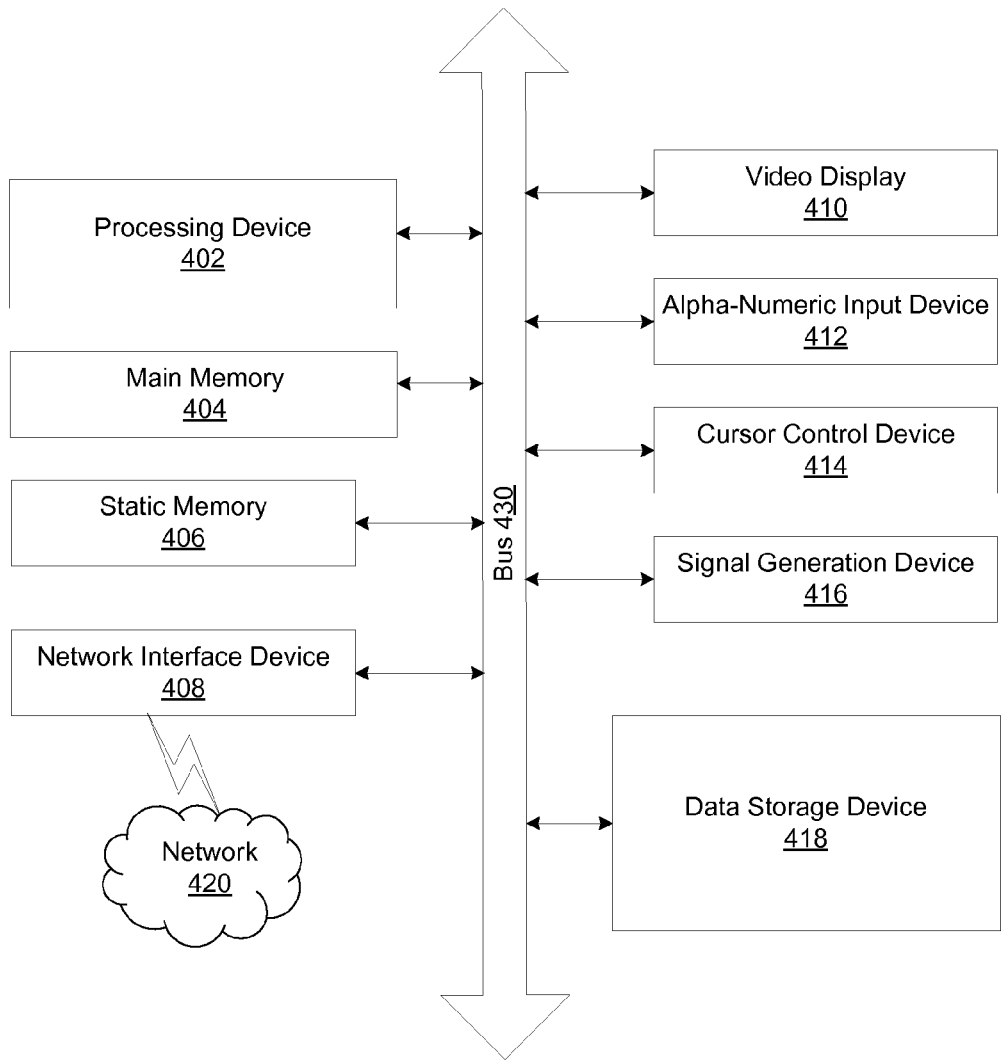
FIG. 4 is a flow diagram illustrating an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Exemplary computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), etc.), static memory 406 (e.g., flash memory, static random access memory (SRAM), etc.), and data storage device 418, which communicate with each other via bus 430. Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

In one example, the instructions are for enforcing separation of environments using cryptography (computing system 100 of FIG. 1) and/or a software library containing methods that call a system for enforcing separation of environments using cryptography. While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ized," "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system for enforcing strict separation of software, the method comprising:
    receiving, at a server, an application that includes a first signature, the first signature generated by a first signing key,
        wherein the first signing key is a member of a first cryptographic key pair that comprises a first verifying key and the first signing key, and
        wherein the first verifying key is accessible to one or more computing devices that are members of a first computing environment;
    removing, at the server, the first signature from the application;
    generating, at the server, a signed application by associating a second signature with the application,
        wherein the second signature is generated by a second signing key that is a member of a second cryptographic key pair that comprises a second verifying key and the second signing key,
        wherein the second verifying key is accessible to one or more computing devices that are members of a second computing environment, and
        wherein the first computing environment and the second computing environment are different computing environments selected from the group comprising: a development environment, a quality assurance environment, a testing environment, and a production environment;
    loading the signed application into memory at a computing device; and at least one of:
        determining that the signed application is verified if the computing device is a member of the second computing environment, or
        determining that the signed application is not verified if the computing device is not a member of the second computing environment.

2. The method of claim 1, wherein the first computing environment and the second computing environment correspond to different security domain computing environments.

3. The method of claim 1, wherein the first computing environment and the second computing environment correspond to different business unit computing environments.

4. The method of claim 1, wherein the computing device verifies the signed application during initialization of the computing device.

5. The method of claim 4, wherein the initialization comprises using one or more verifying keys, wherein at least one of the one or more verifying keys is the second verifying key; the initialization further comprising:
- executing a firmware code to load a boot loader;
- using the one or more verifying keys, verifying a signature associated with a boot loader;
- upon verifying the signature associated with the boot loader, executing the boot loader to load an operating system kernel;
- using the one or more verifying keys, verifying a signature associated with the operating system kernel; and
- upon verifying of the signature associated with the operating system kernel, executing the operating system kernel,
  - wherein one of: i) the boot loader or ii) the operating system kernel, is the signed application.

6. The method of claim 1, wherein a package manager uses the second verifying key to verify the second signature.

7. The method of claim 1, wherein the computing device is a member of a plurality of computing environments and has access to verifying keys for each one of the plurality of computing environments for which the computing device is a member.

8. The method of claim 1, wherein the first cryptographic key pair and the second cryptographic key pair enforce site or organization localized provisioning policy at the first computing environment and the second computing environment.

9. A non-transitory machine-readable medium having stored thereon machine-readable instructions executable to cause a machine to perform operations comprising:
- receiving an application that includes a first signature, the first signature generated by a first signing key,
  - wherein the first signing key is a member of a first cryptographic key pair that comprises a first verifying key and the first signing key, and
  - wherein the first verifying key is accessible to one or more computing devices that are members of a first computing environment;
- removing the first signature from the application;
- generating a signed application by associating a second signature with the application,
  - wherein the second signature is generated by a second signing key that is a member of a second cryptographic key pair that comprises a second verifying key and the second signing key,
  - wherein the second verifying key is accessible to one or more computing devices that are members of a second computing environment, and
  - wherein the first computing environment and the second computing environment are different computing environments selected from the group comprising: a development environment, a quality assurance environment, a testing environment, and a production environment;
  - wherein the signed application is loaded into memory at a computing device that determines at least one of:
    - that the signed application is verified if the computing device is a member of the second computing environment, or
    - that the signed application is not verified if the computing device is not a member of the second computing environment.

10. The non-transitory machine-readable medium of claim 9, wherein the first computing environment and the second computing environment correspond to different security domain computing environments.

11. The non-transitory machine-readable medium of claim 9, wherein the first computing environment and the second computing environment correspond to different business unit computing environments.

12. The non-transitory machine-readable medium of claim 9, wherein the computing device verifies the signed application during initialization of the computing device.

13. The non-transitory machine-readable medium of claim 12, wherein the initialization comprises using one or more verifying keys, wherein at least one of the one or more verifying keys is the second verifying key; the initialization further comprising:
- executing a firmware code to load a boot loader;
- using the one or more verifying keys, verifying a signature associated with a boot loader;
- upon verifying the signature associated with the boot loader, executing the boot loader to load an operating system kernel;
- using the one or more verifying keys, verifying a signature associated with the operating system kernel; and
- upon verifying of the signature associated with the operating system kernel, executing the operating system kernel,
  - wherein one of: i) the boot loader or ii) the operating system kernel, is the signed application.

14. The non-transitory machine-readable medium of claim 9, wherein a package manager uses the second verifying key to verify the second signature.

15. A system comprising:
- a server including one or more hardware processors coupled to a non-transitory memory and configured to read instructions from the non-transitory memory to cause the server to perform operations comprising:
- receiving an application that includes a first signature, the first signature generated by a first signing key,
  - wherein the first signing key is a member of a first cryptographic key pair that comprises a first verifying key and the first signing key, and
  - wherein the first verifying key is accessible to one or more computing devices that are members of a first computing environment;
- removing the first signature from the application;
- generating a signed application by associating a second signature with the application,
  - wherein the second signature is generated by a second signing key that is a member of a second cryptographic key pair that comprises a second verifying key and the second signing key,
  - wherein the second verifying key is accessible to one or more computing devices that are members of a second computing environment, and
  - wherein the first computing environment and the second computing environment are different computing environments selected from the group comprising: a development environment, a quality assurance environment, a testing environment, and a production environment;
  - wherein the signed application is loaded into memory at a computing device that determines at least one of:
    - that the signed application is verified if the computing device is a member of the second computing environment, or
    - that the signed application is not verified if the computing device is not a member of the second computing environment.

16. The system of claim 15, wherein the first computing environment and the second computing environment correspond to different security domain computing environments.

17. The system of claim 15, wherein the first computing environment and the second computing environment correspond to different business unit computing environments.

18. The system of claim 15, wherein the computing device verifies the signed application during initialization of the computing device.

19. The system of claim 18, wherein the initialization comprises using one or more verifying keys, wherein at least one of the one or more verifying keys is the second verifying key; the initialization further comprising:
   executing a firmware code to load a boot loader;
   using the one or more verifying keys, verifying a signature associated with a boot loader;
   upon verifying the signature associated with the boot loader, executing the boot loader to load an operating system kernel;
   using the one or more verifying keys, verifying a signature associated with the operating system kernel; and
   upon verifying of the signature associated with the operating system kernel, executing the operating system kernel,
      wherein one of: i) the boot loader or ii) the operating system kernel, is the signed application.

20. The system of claim 15, wherein a package manager uses the second verifying key to verify the second signature.

* * * * *